Patented May 16, 1950

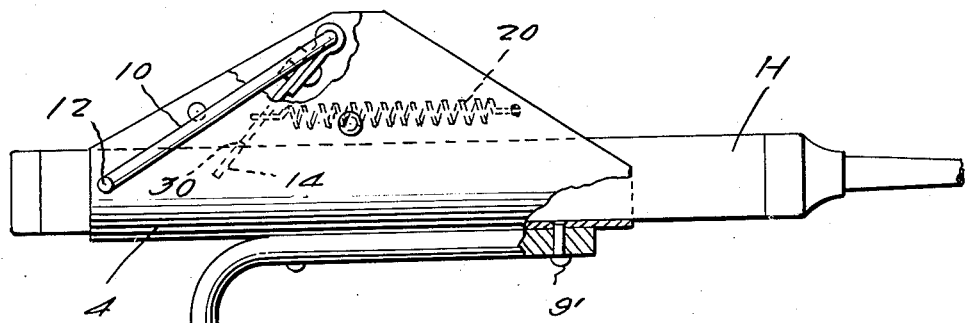
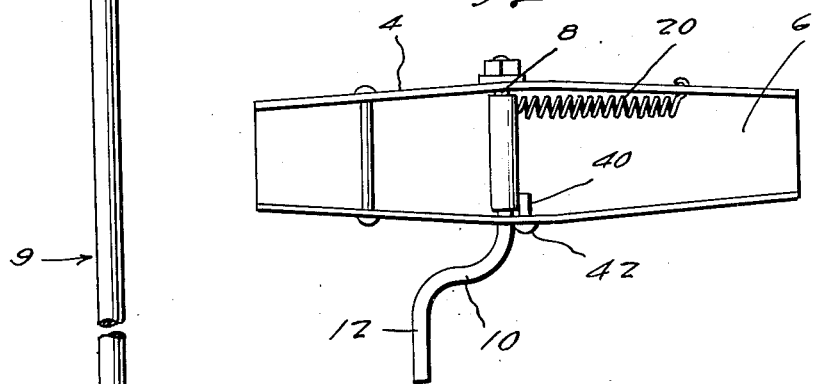
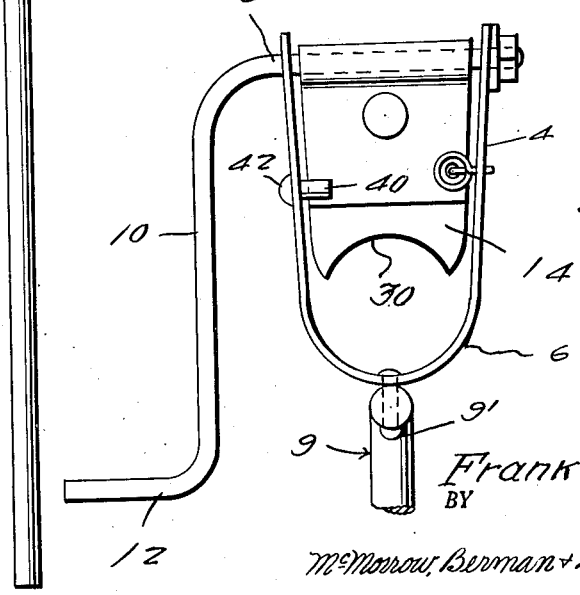

2,507,650

UNITED STATES PATENT OFFICE 2,507,650

FISHING ROD HOLDER

Frank R. Seiple, St. Louis, Mo.

Application October 3, 1947, Serial No. 777,652

3 Claims. (Cl. 248—38)

This invention relates to an improved fishing rod holder for securely supporting a fishing rod in fishing position from a support other than the fisherman's body, the primary object of the invention being to provide construction such that the device is not only economical to manufacture, but is capable of ready use, and which is composed of but a small number of simple parts easily assembled into a cooperating arrangement calculated to accomplish the desired result of holding the fishing rod against accidental displacement.

Various other objects and advantages of the invention will become more apparent after a reading of the following description of the preferred form thereof and reference will be had to the accompanying drawings, wherein:

Figure 1 is a side elevational view of a device embodying the features of the invention.

Figure 2 is a top plan view of the device.

Figure 3 is an enlarged end elevational view.

Referring now to the invention more in detail, the invention will be more fully described.

The main body part consists of a U-shaped channel member having side walls 4 and a bottom wall 6. Extending between the side walls 4 and rotatable therein is the pin portion 8 of an operating crank 10 having a handle 12.

Fixed on the pin part 8 is a depending jaw plate 14 which may vary in form, but preferably consists of a strip of sheet metal which is crimped around the pin in the manner shown. The plate 14 is adapted to be swung on the axis of the pin 8 through rotation thereof by means of the handle 12.

A coil spring 20 is stretched and has its rear end secured to the jaw plate 14 and its forward end secured to a forward part of the channel whereby the jaw plate is urged forwardly and downwardly from a rearwardly declining retracted position in such a way that the lower edge of the plate will forcibly engage the upper side of a fishing rod H positioned with the channel and thereby lock the rod H in place. The jaw plate 14 is preferably formed to have an arcuate lower edge 30 for cooperation with the rounded upper side of the fishing rod H.

There is also preferably provided a stop for limiting forward swinging of the jaw plate 14, in order to prevent the jaw plate from being operated to a position beyond center. This may take various forms, but is preferably in the form of a rivet or pin 40 which extends into the channel from a side wall 4 of the body of the device at a point just forwardly of the pin member 8, or that is, the pivot of the plate member. Secured along the bottom of the body of the device by rivets 9' is a right angular arm on the upper end of a perpendicular rod 9 adapted for connection in suitable manner to a selected support.

From the foregoing it will now be seen that there is herein provided a device which accomplishes all the objects of this invention, and others, including many advantages of great practical utility and commercial importance.

As many embodiments may be made of this inventive concept, and as many modifications may be made in the embodient hereinbefore shown and described, it is to be understood that all matter herein is to be interpreted merely as illustrative and not in a limiting sense.

I claim:

1. A holder for a fishing rod or the like, said holder comprising a body having spaced sidewalls and a bottom wall forming a channel to supportably receive the fishing rod, a crank having a pin journalled transversely in and extending between said sidewalls at a substantial elevation above the bottom wall of the channel body and above the upper side of a fishing rod in place in said channel, said crank having a handle positioned along one side of said body, a jaw plate secured to depend from said crank pin between the channel sidewalls, said jaw plate being sufficiently vertically elongated to engage its lower edge with the upper side of a fishing rod in place in said channel with said jaw plate in a downwardly angulated position, and spring means operating between said body and said jaw plate and acting to pivotally depress said jaw plate with sufficient force to press the fishing rod against the channel body in a manner to securely hold the fishing rod in place.

2. A holder for a fishing rod or the like, said holder comprising a body having spaced sidewalls and a bottom wall forming a channel to supportably receive the fishing rod, a crank having a pin journalled transversely in and extending between said sidewalls at a substantial elevation above the bottom wall of the channel body and above the upper side of a fishing rod in place in said channel, said crank having a handle positioned along one side of said body, a jaw plate secured to depend from said crank pin between the channel sidewalls, said jaw plate being sufficiently vertically elongated to engage its lower edge with the upper side of a fishing rod in place in said channel with said jaw plate in a downwardly angulated position, and spring means operating between said body and said jaw plate and acting to pivotally depress said jaw plate with sufficient force to press the fishing rod against the channel body in a manner to securely hold the fishing rod in place, said crank handle being arranged to be swingable in one direction to sufficiently elevate said jaw plate against the tension of said spring means to provide for free endwise insertion of the fishing rod into the channel and swingable in the opposite direction to aid said spring means in depressing said jaw plate into holding relation to the fishing rod.

3. A holder for a fishing rod or the like, said holder comprising a body having spaced sidewalls and a bottom wall forming a channel to supportably receive the fishing rod, a crank having a pin journalled transversely in and extending between said sidewalls at a substantial elevation above the bottom wall of the channel body and above the upper side of a fishing rod in place in said channel, said crank having a handle positioned along one side of said body, a jaw plate secured to depend from said crank pin between the channel sidewalls, said jaw plate being sufficiently vertically elongated to engage its lower edge with the upper side of a fishing rod in place in said channel with said jaw plate in a downwardly angulated position, and spring means operating between said body and said jaw plate and acting to pivotally depress said jaw plate with sufficient force to press the fishing rod against the channel body in a manner to securely hold the fishing rod in place, said crank handle being arranged to be swingable in one direction to sufficiently elevate said jaw plate against the tension of said spring means to provide for free endwise insertion of the fishing rod into the channel and swingable in the opposite direction to aid said spring means in depressing said jaw plate into holding relation to the fishing rod, a sidewall of said body having an inwardly projecting stop positioned to prevent swinging of said jaw plate beyond center position by operation of said crank handle and/or spring means.

FRANK R. SEIPLE.

REFERENCES CITED

The following references are of record in the file of this patent:

UNITED STATES PATENTS

| Number | Name | Date |
|---|---|---|
| 1,534,642 | Hoaglund | Apr. 21, 1925 |